(12) United States Patent
Xiong

(10) Patent No.: US 12,446,733 B1
(45) Date of Patent: Oct. 21, 2025

(54) CUTTING BOARD WITH CUSHIONING SOFT PADS

(71) Applicant: Bin Xiong, Jiangxi (CN)

(72) Inventor: Bin Xiong, Jiangxi (CN)

(73) Assignee: Bin Xiong, Jiangxi (CN)

( * ) Notice: Subject to any disclaimer, the term of this patent is extended or adjusted under 35 U.S.C. 154(b) by 0 days.

(21) Appl. No.: 19/215,252

(22) Filed: May 21, 2025

(51) Int. Cl.
*A47J 47/00* (2006.01)

(52) U.S. Cl.
CPC .................................. *A47J 47/005* (2013.01)

(58) Field of Classification Search
CPC .................................................... A47J 47/005
See application file for complete search history.

(56) References Cited

U.S. PATENT DOCUMENTS

| | | | | |
|---|---|---|---|---|
| 2007/0181563 A1* | 8/2007 | Hiel | ........................ | A47J 37/01 |
| | | | | 426/19 |
| 2014/0097566 A1* | 4/2014 | Rivera | .................. | A47J 47/005 |
| | | | | 248/304 |
| 2018/0110377 A1* | 4/2018 | Assassa | ................ | A47J 47/005 |

* cited by examiner

*Primary Examiner* — Lee D Wilson

(57) ABSTRACT

The present application discloses a cutting board, comprising: a rigid base plate; a first cushioning soft pad, attached onto one side of the rigid base plate; and a second cushioning soft pad, attached onto the other side of the rigid base plate. As the first and second cushioning soft pads are respectively attached and fixed to the rigid base plate, they can be quickly detached from the rigid base plate and each part can be cleaned thoroughly, making the cutting board more hygienic during use. Additionally, the impact resistance of the cutting board is enhanced, improving its practicality and safety.

11 Claims, 2 Drawing Sheets

CUTTING BOARD WITH CUSHIONING SOFT PADS

TECHNICAL FIELD

The present application relates to the field of kitchen utensils, and more particularly to a cutting board.

BACKGROUND

A cutting board, also known as a chopping board, is a utensil placed on a table to protect its surface while cutting food. Traditional tempered glass cutting boards lack an effective buffering structure and are highly prone to shattering upon impact or when dropped. At present, there is an urgent need to design an impact-resistant cutting board to address the significant technical shortcomings in terms of practicality and safety found in existing cutting boards.

SUMMARY

The present application provides a cutting board. Through the attachment of a first cushioning soft pad and a second cushioning soft pad to a rigid base plate, both cushioning soft pads can be quickly detached for cleaning. This ensures that each part of the cutting board can be thoroughly cleaned, thereby enhancing hygiene during use. The design also improves impact resistance, addressing the significant shortcomings in practicality and safety found in existing cutting boards.

The present application discloses a cutting board comprising: a rigid base plate; a first cushioning soft pad attached to one side of the rigid base plate; and a second cushioning soft pad attached to the other side of the rigid base plate.

In the preferred embodiments, both surfaces of the rigid base plate are smooth; the rigid base plate is made of glass; the first and second cushioning soft pads are silicone buffer pads; the first cushioning soft pad includes a first magnetic structure; the second cushioning soft pad includes a second magnetic structure; the first and second magnetic structures are arranged correspondingly; the first magnetic structure comprises parallel strip-shaped magnetic bars; the second magnetic structure also comprises parallel strip-shaped magnetic bars, with each bar in the first magnetic structure corresponding to a bar in the second magnetic structure; the facing sides of the corresponding magnetic bars have opposite magnetic poles; the strip-shaped magnetic bars in the first magnetic structure are arranged with alternating magnetic polarities, while the magnetic bars in the second magnetic structure are arranged correspondingly; the strip-shaped magnetic bars in the first magnetic structure are separately embedded within the cushioning soft pad, and the bars in the second magnetic structure are correspondingly embedded; the strip-shaped magnetic bars are integrally embedded into the cushioning soft pads; the first and second magnetic structures are neodymium-iron-boron (NdFeB) magnetic strips; the first and second cushioning soft pads are injection-molded from food-grade liquid silicone; both ends of the rigid base plate are provided with bidirectional raised strips, and the surfaces of the raised strips are further provided with anti-slip features and positioning protrusions for stable placement of the cutting board.

In the preferred embodiments, the first and second cushioning soft pads are securely attached to the rigid base plate, and can be quickly detached for cleaning. This ensures that all parts of the cutting board can be deeply cleaned, enhancing hygiene during use. In addition, the design improves the cutting board's impact resistance, making it more practical and safer.

REFERENCE NUMERALS

11—rigid base plate;
12—first cushioning soft pad;
13—second cushioning soft pad;
14—first magnetic structure;
15—second magnetic structure;
16—bidirectional raised strip;
17—anti-slip structure;
18—positioning protrusion.

DETAILED DESCRIPTION

The following detailed description is made in reference to the drawings of the embodiments of the present application. It should be understood that the described embodiments are only a part of the embodiments of the present application, and not all embodiments. All other embodiments obtained by those skilled in the art based on the embodiments of the present application without any creative effort shall fall within the scope of protection of the present application.

A cutting board, also known as a chopping board, is an object placed on a table to prevent damage when chopping vegetables or other items. Current kitchen glass cutting boards have significant practical and safety flaws. For example, traditional tempered glass cutting boards lack effective buffering structures at the edges, making them prone to breaking upon collision or when dropped.

Figure 1:
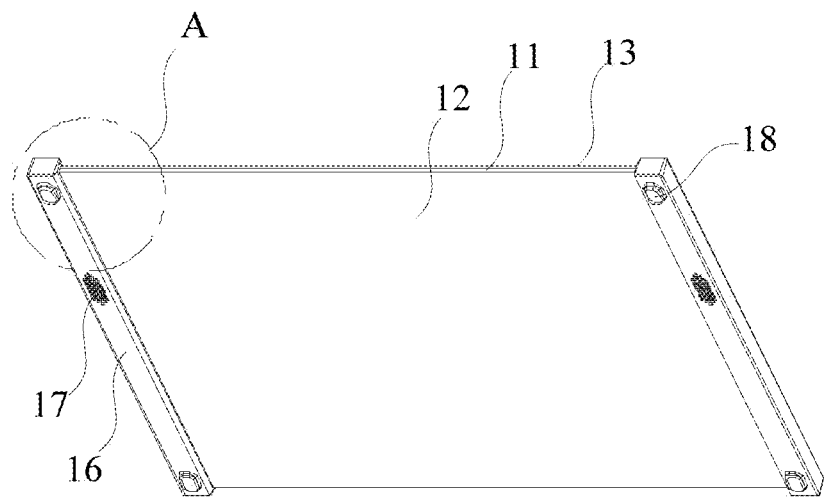
FIG. 1 is a schematic view showing the overall structure of the cutting board disclosed in the present application.
Figure 2:
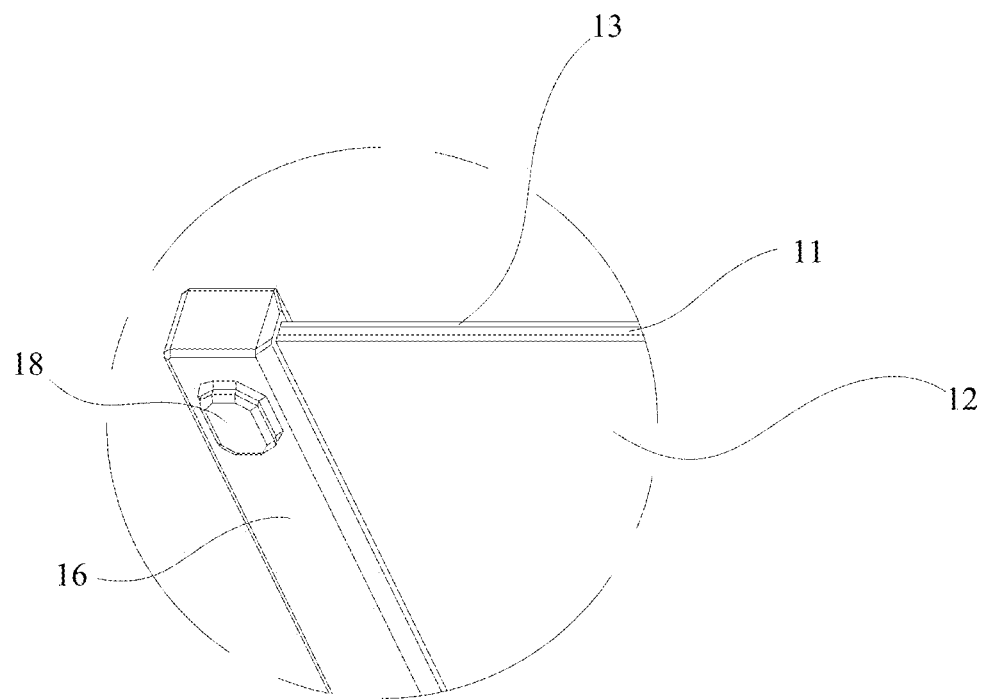
FIG. 2 is an enlarged view of area A in FIG. 1.
Figure 3:
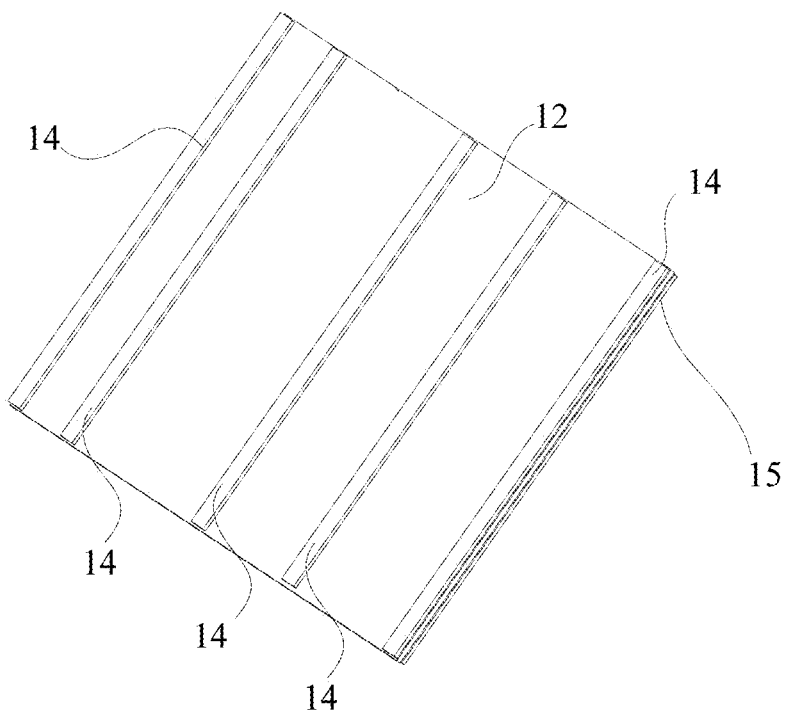
FIG. 3 is a schematic view showing a partial structure of the cutting board of the present application.
Figure 4:
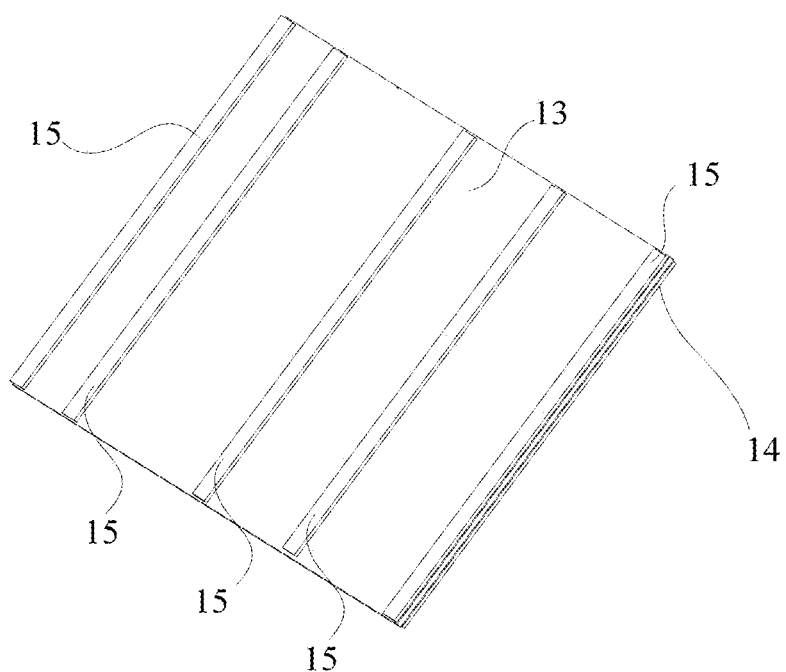
FIG. 4 is another schematic view showing a partial structure of the cutting board of the present application.

Referring to FIGS. 1 and 2, one embodiment of the present application discloses a cutting board, which includes: a rigid base plate 11; a first cushioning soft pad 12, attached to one side of the rigid base plate 11; a second cushioning soft pad 13, attached to the other side of the rigid base plate 11. In this embodiment, by attaching the first and second cushioning pads to the rigid base plate 11, the first and second cushioning pads can be quickly removed and cleaned separately from the rigid base plate 11. This ensures that each part of the cutting board can be deeply cleaned, making the cutting board more hygienic during use. At the same time, this improves the cutting board's shock resistance, making it more practical and safe.

In one embodiment of the present application, to enhance the firm attachment of the first and second cushioning pads to the rigid base plate 11, the rigid base plate 11 has smooth surfaces on both sides.

In one embodiment of the present application, the rigid base plate 11 is a glass plate. In this embodiment, by attaching cushioning soft pads to both sides of the glass plate, the issues present in traditional glass cutting boards—such as difficulty in cleaning, slippage, and the fragile edges of tempered glass being prone to impact—are overcome. When cleaning the cutting board after use, the user's hand can be used to press against and create friction on the cushioning soft pads, making it easier and more secure for the user to clean the board. This facilitates a more thorough cleaning, ensuring the cutting board remains clean and tidy.

In one embodiment of the present application, the first cushioning soft pad 12 and the second cushioning soft pad 13 are both silicone cushioning soft pads.

Referring to FIGS. 1 through 4, in one embodiment of the present application, to further stabilize the attachment of the first and second cushioning pads to the rigid base plate 11, the first cushioning soft pad 12 is provided with a first magnetic structure 14; the second cushioning soft pad 13 is provided with a second magnetic structure 15, and the first magnetic structure 14 corresponds to the second magnetic structure 15. Specifically, the first magnetic structure 14 consists of parallel strip-shaped magnets, and the second magnetic structure 15 consists of parallel strip-shaped magnets. Each strip of the first magnetic structure 14 corresponds to a strip of the second magnetic structure 15, with the opposite magnetic poles on the sides facing each other. In this embodiment, the magnetic attraction between the cushioning soft pads on both sides of the rigid base plate 11 is achieved through the corresponding magnetic structures. For example, referring to FIGS. 3 and 4, the magnetic poles on the side of the first magnetic structure 14 facing the rigid base plate are alternately positive, negative, positive, negative, positive; while the magnetic poles on the side of the second magnetic structure 15 facing the rigid base plate are alternately negative, positive, negative, positive, negative. It should be noted that the spacing between the magnetic structures in this embodiment can be either equal or unequal. In one preferred embodiment the spacing between the magnetic structures is equal.

In one preferred embodiment, to make the attachment of the first and second cushioning pads to the rigid base plate 11 even more stable, the magnetic poles of the strip-shaped magnets in the first magnetic structure 14 are arranged in a staggered pattern, while the magnetic poles of the strip-shaped magnets in the second magnetic structure 15 are arranged correspondingly.

In one preferred embodiment, to ensure a more stable attachment of the first and second cushioning pads to the rigid base plate 11, the strip-shaped magnets in the first magnetic structure 14 are segmented by the first cushioning soft pad, and the strip-shaped magnets in the second magnetic structure 15 are similarly segmented by the corresponding second cushioning soft pad.

In one embodiment, to avoid the problem of traditional magnetic strips being exposed and prone to oxidation, the strip-shaped magnets are integrally molded into the cushioning soft pads In one embodiment, the first magnetic structure 14 and the second magnetic structure 15 are made of neodymium-iron-boron magnetic strips.

In one embodiment, the first cushioning soft pad 12 and the second cushioning soft pad 13 are both made from food-grade liquid silicone by injection molding.

In one embodiment, the rigid base plate 11 has bidirectional raised strips 16 at both ends. The surface of the bidirectional raised strips 16 also has an anti-slip structure 17 and positioning protrusions 18 to make it easier to place the cutting board. In this embodiment, the bidirectional raised strips 16 allow both the first cushioning soft pad 12 and the second cushioning soft pad 13 to be used for cutting, while the positioning protrusions 18 make it more convenient for the user to store the cutting board.

The following provides a detailed description of some embodiments of the present application with reference to FIGS. 1-4. In the absence of any conflicting situations, the following embodiments and features in the embodiments can be combined with each other.

In the first embodiment, the cutting board includes: a rigid base plate 11, a first cushioning soft pad 12 attached to one side of the rigid base plate 11, and a second cushioning soft pad 13 attached to the other side of the rigid base plate 11. In this embodiment, the cushioning soft pads on both sides of the rigid base plate are attached to the rigid base plate 11. It should be noted that in this embodiment, the rigid base plate 11 and the cushioning soft pads only need to be able to attract each other to achieve the basic function of use, which falls within the protection scope of this application.

In the second embodiment, the cutting board is an improvement over the cutting board of the first embodiment. Based on the first embodiment, the surface of the rigid base plate is made smooth to make the attachment of the rigid base plate 11 and the cushioning soft pads more secure. It should be noted that in this embodiment, the rigid base plate 11 can be made from hard materials such as wood, metal, or glass, as long as the requirements are met. This is not a limitation.

In the third embodiment, the cutting board is based on the first embodiment, and the rigid base plate material is specifically set as a glass plate.

In the fourth embodiment, the cutting board is based on the first embodiment, with the first cushioning soft pad 12 and the second cushioning soft pad 13 both being made of silicone cushioning pads.

In the fifth embodiment, the cutting board is based on the second embodiment, with the first cushioning soft pad 12 and the second cushioning soft pad 13 both being configured as silicone cushioning pads, and the rigid base plate 11 having smooth surfaces on both sides.

In the sixth embodiment, the cutting board is based on the third embodiment, both the first cushioning soft pad 12 and the second cushioning soft pad 13 are configured as silicone cushioning pads, and the rigid base plate 11 is specifically configured as a glass plate.

In the seventh embodiment, the cutting board is based on the first embodiment, a first magnetic structure 14 is disposed inside the first cushioning soft pad 12, and a second magnetic structure 15 is disposed inside the second cushioning soft pad 13. The first magnetic structure 14 and the second magnetic structure 15 are arranged in corresponding positions.

In the preferred version of the embodiment, the first magnetic structure 14 is provided inside the first cushioning soft pad 12, and the second magnetic structure 15 is provided inside the second cushioning soft pad 13. The first and second magnetic structures are arranged to correspond with each other. Specifically, the first magnetic structure 14 comprises a plurality of strip-shaped magnetic bars arranged in parallel, and the second magnetic structure 15 also comprises a plurality of strip-shaped magnetic bars arranged in parallel. Each magnetic bar in the first magnetic structure 14 corresponds to a magnetic bar in the second magnetic structure 15, and the adjacent sides of the corresponding magnetic bars have opposite magnetic polarities.

In the preferred version of the embodiment, the magnetic bars in the first magnetic structure 14 are arranged with alternating magnetic polarities, and the magnetic bars in the second magnetic structure 15 are arranged with corresponding polarities.

In the preferred version of the embodiment, the magnetic bars in the first magnetic structure 14 are separated by sections of the silicone cushioning soft pad, and the magnetic bars in the second magnetic structure 15 are correspondingly separated by the silicone cushioning soft pad.

In the eighth embodiment, the cutting board is based on the first embodiment, the rigid base plate 11 is a glass plate, and both the first cushioning soft pad 12 and the second cushioning soft pad 13 are silicone cushioning pads. A first magnetic structure 14 is disposed inside the first cushioning soft pad 12, and a second magnetic structure 15 is disposed inside the second cushioning soft pad 13. The first magnetic structure 14 and the second magnetic structure 15 are arranged in corresponding positions.

In the preferred version of the embodiment, the first magnetic structure 14 is provided within the first cushioning soft pad 12, and the second magnetic structure 15 is provided within the second cushioning soft pad 13. The two magnetic structures are arranged in corresponding positions. Specifically, the first magnetic structure 14 comprises a plurality of strip-shaped magnetic bars arranged in parallel, and the second magnetic structure 15 also comprises a plurality of strip-shaped magnetic bars arranged in parallel. Each magnetic bar in the first magnetic structure 14 corresponds to a magnetic bar in the second magnetic structure 15, and the sides of the magnetic bars that face each other have opposite magnetic polarities.

In the preferred version of the embodiment, the magnetic bars in the first magnetic structure 14 are arranged with alternating polarities, and the magnetic bars in the second magnetic structure 15 are arranged with corresponding polarities.

In the preferred version of the embodiment, the strip-shaped magnetic bars in the first magnetic structure 14 are separated by the sections of the silicone cushioning soft pad, and the strip-shaped magnetic bars in the second magnetic structure 15 are likewise separated by corresponding sections of the silicone cushioning soft pad.

In the preferred version of the embodiment, the strip-shaped magnetic bars are integrally embedded into the first and second silicone cushioning soft pads.

The above description only illustrates preferred embodiments of the present invention and should not be construed as limiting the scope of the invention. Any equivalent structural modifications or direct/indirect applications in other technical fields made based on the inventive concept described in the specification and accompanying drawings shall fall within the scope of patent protection of the present invention.

It should also be understood that the term "and/or" used in this specification and the appended claims refers to any combination of one or more of the listed items and all possible combinations, and includes those combinations. Any modifications or substitutions that a person skilled in the art can easily conceive within the technical scope disclosed in this application shall fall within the scope of protection of this application. Therefore, the scope of protection of this application should be determined by the scope of the claims.

What is claimed is:

1. A cutting board, comprising:
   a rigid base plate having a first side and an opposite second side;
   a first food-grade silicone cushioning pad removably attached to the first side of the rigid base plate;
   a second food-grade silicone cushioning pad removably attached to the second side of the rigid base plate,
   wherein the first cushioning pad comprises a first magnetic attachment structure disposed along at least one edge thereof;
   wherein the second cushioning pad comprises a second magnetic attachment structure disposed along at least one edge thereof corresponding to the first magnetic attachment structure;
   wherein the first and second magnetic attachment structures enable quick detachment of the first and second cushioning pads from the rigid base plate for separate cleaning.

2. The cutting board of claim 1, characterized by the rigid base plate having smooth surfaces on both sides.

3. The cutting board of claim 1, characterized by the rigid base plate being a glass plate.

4. The cutting board of claim 1, characterized by both the first cushioning soft pad and the second cushioning soft pad being silicone buffer pads.

5. The cutting board of claim 4, characterized by the first cushioning soft pad being provided with a first magnetic structure, and the second cushioning soft pad being provided with a second magnetic structure, wherein the first magnetic structure is arranged to correspond to the second magnetic structure.

6. The cutting board of claim 5, characterized by the first magnetic structure consisting of parallel elongated magnetic strips, and the second magnetic structure consisting of parallel elongated magnetic strips; each first magnetic structure corresponding to a second magnetic structure, and the adjacent poles of the corresponding first and second magnetic structures are oppositely aligned.

7. The cutting board of claim 6, characterized by the magnetic poles of the elongated magnetic strips in the first magnetic structure being arranged alternately, and the magnetic poles of the elongated magnetic strips in the second magnetic structure being correspondingly arranged.

8. The cutting board of claim 7, characterized by the elongated magnetic strips in the first magnetic structure being divided and arranged by the first and second cushioning soft pads, and the elongated magnetic strips in the second magnetic structure being correspondingly divided and arranged by the first and second cushioning soft pads.

9. The cutting board of claim 8, characterized by the elongated magnetic structures being integrally molded and embedded into the first and second cushioning soft pads.

10. The cutting board of claim 5, characterized by the first magnetic structure and the second magnetic structure being neodymium iron boron magnetic strips.

11. The cutting board of claim 1, characterized by both ends of the rigid base plate being provided with bidirectional raised strips, and the surface of the bidirectional raised strips being further provided with an anti-slip structure and positioning protrusions to facilitate the placement of the cutting board.

* * * * *